United States Patent

[11] 3,624,505

[72] Inventor Willem J. L. Boreas
       Sayreville, N.J.
[21] Appl. No. 836,828
[22] Filed June 26, 1969
[45] Patented Nov. 30, 1971
[73] Assignee Weston Instruments Division
       Newark, N.J.

[54] HIGH-IMPACT WITHSTANDING TAUT BAND SUSPENSION INSTRUMENT
14 Claims, 14 Drawing Figs.

[52] U.S. Cl. .................................................. 324/154 R
[51] Int. Cl. .................................................. G01r 1/00
[50] Field of Search.......................................... 324/154;
                                                                335/222

[56] References Cited
UNITED STATES PATENTS
3,277,370  10/1966  Clark .......................... 324/154
3,493,864  2/1970  Donath et al. ................. 324/154

Primary Examiner—Alfred E. Smith
Attorneys—William R. Sherman, Stewart F. Moore, Jerry M. Presson and Roylance, Abrams, Berdo & Kaul ABSTRACT: A taut band suspension instrument capable of withstanding severe impact without permanent damage to the taut band suspension. The suspension system is characterized by a taut band which extends between the movable element and frame of the instrument, and has its respective ends mounted to slide along smooth surfaces spaced from the points of connection of the band with both the movable element and the frame. The smooth surfaces along which the band can slide allow the axis of the band to shift when the instrument is subjected to severe impact, and as a result, stresses in the band are substantially lessened. In the preferred embodiment, the instrument is a meter and two taut bands, one extending from each end of a movable coil of the meter, are used.

INVENTOR
WILLEM J. L. BOREAS
BY
Arnold, Roylance, Kruger & Durkee
ATTORNEYS

INVENTOR
WILLEM J. L. BOREAS

HIGH-IMPACT WITHSTANDING TAUT BAND SUSPENSION INSTRUMENT

This invention relates to a taut band suspension system for electrical meters and other measuring instruments which exhibits extreme resistance to breaking in the event of severe impact or shock.

The ruggedized taut band suspension system of this invention is of particular utility in portable instruments, as well as in instruments mounted in a vehicle or airplane where impact and shock resistance is very important. In the preferred embodiment to be described, the instrument is an electrical meter and a moving coil of the meter is supported for rotation relative to the meter frame by the taut band suspension system.

BACKGROUND OF THE INVENTION

Portable and vehicle-mounted instruments of various types must exhibit some degree of resistance to permanent damage in the event of shock and impact. Among the suspensions for electrical meters are the jeweled bearing system and the taut band suspension system. The jeweled bearing system, while somewhat rugged, is quite expensive and the friction forces between the bearings and the moving element shaft make this system undesirable for very sensitive meters, since even slight changes in the friction characteristics of the bearings seriously affect the accuracy of the meter. In addition, the bearings are frequently damaged when subjected to impact or shock, as when the meter in which the jeweled bearings are used is dropped.

In taut-band-suspension-type meters, the moving element, for example, a sensing coil, is suspended between a pair of very thin bands, the bands are tensioned, and are connected to the meter frame to support the coil for pivotal movement about the axis of the bands. Each band acts as a torsion element which permits the coil to pivot when it is energized. Since the suspension system operates in torsion, there is no bearing friction, and the restoring force to return the coil to a zero or initial position is provided by the tensioned band suspension elements.

Customarily, the suspension bands take the form of very thin strips or bands of generally rectangular cross section and in which the width of the band is eight to 12 times its thickness. Because of the uniform restoring forces of the taut band suspension system and the absence of friction, taut band suspension systems are frequently used with very sensitive meters, such as microammeters of the moving coil type.

When used in electrical meters, the taut bands must necessarily be short so that the front-to-back dimensions of the meter are not excessive. In a typical suspension system for a moving coil meter, the effective length of each band is less than one-half inch.

In very sensitive measuring instruments such as microammeters, the taut bands take the form of a flat filament only several thousandths of an inch in width and usually less than one-half thousandth of an inch in thickness. Hence, these taut band elements are very delicate and fragile. A severe problem of the prior art taut band suspension systems is that the band elements frequently broke when the meter was dropped or otherwise subjected to severe shock or impact. Since the band elements form the suspension system for the moving coil of the meter, the meter is absolutely useless if a band breaks.

THE PRIOR ART

In the prior art meters, it has been customary to use two suspension bands, and to fix the inner end of each band to the moving element. The outer end of each band is secured to a resilient connector supported by the meter frame, and having a rounded face or tip across which the band extends. The purpose of the rounded face is to prevent nicking or scoring the suspension band to avoid failure of the band at the connector. Such a construction is shown in British Patent 752,471, published July 11, 1956.

It is also known in the prior art to connect the inner end of each taut band to a connector having a rounded surface around which the band extends and which is carried by the meter coil, and to connect the other end to a second connector supported by the meter frame and also having a rounded face or end. Such an arrangement is shown in Swiss Patent 275,489, issued Aug. 1, 1951. In both the Swiss and British patents, the band is fixed to the connector at a location closely adjacent the rounded face of the connector.

In another prior art construction, namely that of U.S. Pat. No. 3,111,623, Thomander, a connector having a centering recess is provided on both the frame and the coil. The recess has smoothly curved sides and is rounded, and the band extends along the recess and is secured to the connector at a location spaced from the axis of the taut band. The recess prevents displacement of the axis of the band. While these prior art taut band suspension arrangements exhibit some degree of resistance to breakage in the event of shock and impact, a severe shock, such as may be caused by dropping an instrument provided with the suspension system, results in breakage of the band.

SUMMARY OF THE INVENTION

In applicant's construction, the band is mounted on connectors which are somewhat similar to these prior connectors, but which differ significantly in that the band is free to move sideways on smooth surfaces of the end connector elements along which the band extends. The extreme tips of the bands are secured to the end connector elements at a location spaced substantially from the smooth surfaces of the connector elements. By this arrangement, the elements are free to move or slide laterally, especially in response to transverse shock or impact. Hence, the band can shift laterally during impact and can seek to assume its most comfortable or least stressed position on the connector elements after the impact. At least the connector element which is mounted on the instrument frame is resilient, and is in addition, resiliently mounted so it can deflect and move axially under certain conditions of impact. Both the connector elements have band or ribbon-supporting surfaces of sufficient hardness that the ribbon cannot imbed itself in these surfaces and remains free to slide.

Because of the freedom of movement of the ribbon, when shock causes the ribbon to slacken momentarily, the ribbon will yield to the forces exerted on its mass by changing its position as well as its shape. A moment later the ribbon will again be pulled taut against its surfaces of support on the connector element and will reposition itself upon these surfaces. It is evident that in this act of repositioning, local restraints acting against the natural motion of the ribbon will, on completion of the repositioning process, freeze into local stress concentrations which are the cause for abnormal local stresses. Experience with highly restrained ribbons of the prior art as against the less restrained ribbons according to this invention has shown the former to be more prone to breakage under shock and that such breakage commonly occurs at or near a supporting surface. Consequently, it is an objective of this invention to allow the ribbon sufficient freedom in repositioning itself against its surfaces of support so its can seek, unhampered by local restraints, a new position which most closely corresponds to its last preceding floating position and shape. This new position is one in which local stress concentrations are minimized and stresses are most uniformly distributed throughout the ribbon. In simplest language, this new position of the ribbon may be termed its "most comfortable" position.

Correspondingly, an object of this invention is a taut band suspension system for instruments in which the taut band is secured to connector elements of unique construction which permit transverse movement of the band along smooth surfaces of the connector elements to allow the axis of the band to displace itself during impact.

Another object is a taut band suspension system for an electric meter in which the connector elements to which the opposite ends of the taut band are connected have smoothly rounded long radius ends tangent to the band, and in which the extreme ends of the band are secured at locations substantially remote from the pivotal axis of the moving element supported by the band.

A further object is a taut band suspension system for extremely sensitive instruments particularly characterized by extreme resistance to breakage of the bands of the system as a result of severe impact or shock, the taut band system including end connectors of unique construction having transverse portions smoothly merging with a rounded end tangent to the band, and in which the band is secured to the transverse portions of the connectors only at a location substantially spaced from the pivotal axis of the moving element of the instrument.

A further object is a sensitive electric meter satisfying the above objects, and employing a taut band suspension system in which the ends of the band connected to the frame of the meter are resiliently supported, and in which the ends of the bands connected to the moving element of the meter are rigidly supported.

A still further object is a taut band suspension arrangement for an electric meter satisfying the above objects, in which a rigid connector element is carried by the moving element of the meter, a resilient connector element is carried by the frame of the meter, the resilient element has a smooth rounded face along which the taut band can slide transversely, is resiliently mounted on the frame by a spring element which maintains the desired tension in the taut band, and the taut band extends between and is secured to the two connectors only at locations along the connectors spaced substantially from the axis of rotation of the moving element.

Numerous other features and advantages of this invention will become apparent with reference to the drawings, which form a part of this specification, and in which.

Figure 1:
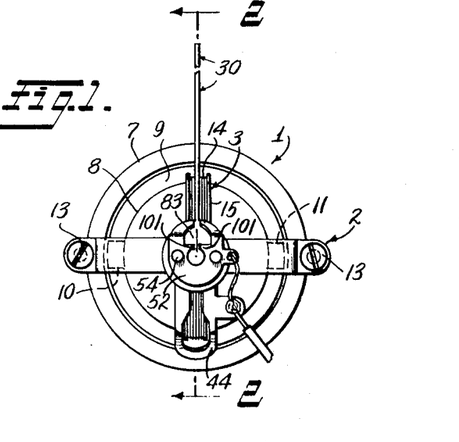
FIG. 1 is a front elevational view of a meter embodying the improved taut band suspension system of this invention.
Figure 2:
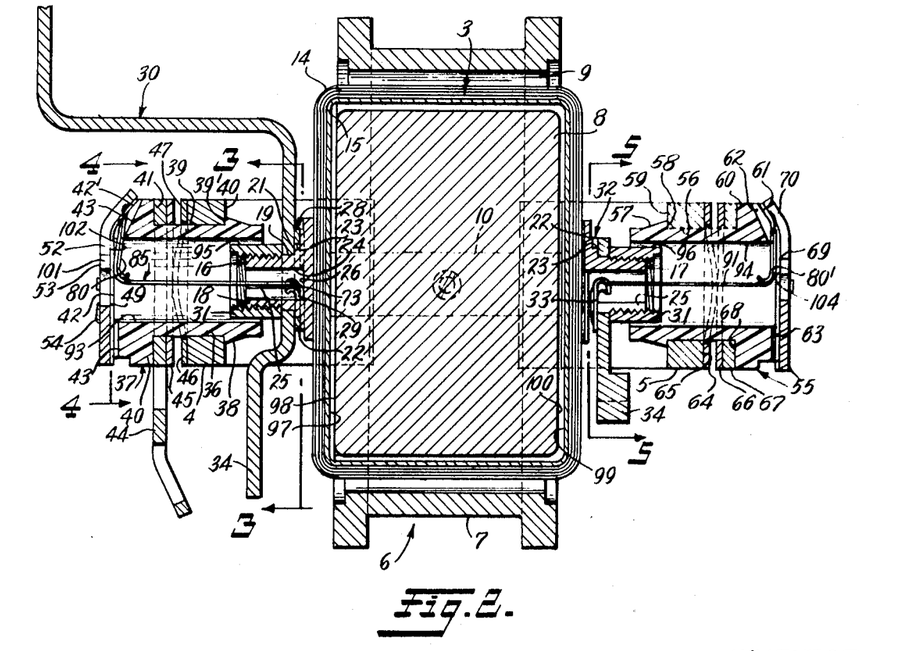
FIG. 2 is an enlarged side elevational view in section, of the meter of FIG. 1, taken along line 2—2 of FIG. 1.

Referring now to the drawings in detail, and particularly to FIGS. 1 and 2, there is shown an instrument in the form of a permanent magnet moving coil meter 1 which is provided with the improved taut band suspension arrangement of this invention. Meter 1 includes a stationary assembly in the form of a support or frame 2, and a movable assembly in the form of a coil assembly 3 supported for pivotal movement by frame 2.

Frame assembly 2 includes a front frame element 4 and a rear frame element 5 which are secured to a magnetic structure 6 of the meter. The magnetic structure 6 includes a ring 7 of magnetic material and a cylindrical permanent magnet core 8 within the ring. The core is of a smaller diameter than the inside surface of the ring to provide the usual annular airgap 9 between the ring and the core.

Core 8 is maintained in concentric relation to the ring by spacer blocks 10 and 11 which extend through airgap 9 in diametrically opposed relation to each other and are secured respectively to the core and the ring. Spacer blocks 10 and 11 are of magnetic material to complete a magnetic circuit from the core to the ring. The magnetic structure 6 is disposed between front frame element 4 and rear frame element 5 and the frame elements are securely clamped to the ring 7 of the magnetic structure by screws 13 which extend between the respective frame elements.

Coil assembly 3 includes a coil 14 having a plurality of turns of insulated coil wire wound on a rigid rectangular coil form 15. As shown at FIG. 2, the internal dimensions of the coil form 15 are only slightly greater than the external dimensions of core 8 and hence, all the inside surfaces of the coil form are spaced slightly from the exterior surfaces of the core. The coil assembly is, of course, positioned on the core before the core is secured to ring 7.

The coil assembly 3 also includes a hub 16 secured to one side of coil form 15 and a hub 17 secured to the opposite side of coil form 15 and aligned with hub 16. Each hub has a threaded cylindrical tip 18 and the axes of the tips are aligned with each other and pass through the geometric center of coil form 15. Each hub also has a cylindrical portion 19, slightly larger than the tip, and with flat sides 20. Cylindrical portion 19 terminates at a transverse annular shoulder 21. Spaced inwardly of shoulder 21, in a direction toward coil 14, is a second shoulder 22. Between these shoulders is a cylindrical portion 23 which extends between the transverse surfaces of the shoulders. Each hub has a central bore 24 and a transverse slot 25 which extends from the front of tip 18 to a location slightly inwardly of shoulder 22 to provide a flat outwardly facing surface 26.

Mounted on hub 16 is a first or inner connector element 28 which is ring shaped and has a radially inwardly projecting arm 29 which extends through slot 25. The inside diameter of the ring-shaped portion of connector element 28 corresponds with the outside diameter of cylindrical portion 23 so the connector element is snugly received on cylindrical portion 23 of the hub and the inner face of the connector seats on shoulder 22. A pointer 30 is mounted on cylindrical portion 19 of hub 16. The pointer has an opening with flat sides that engage the flat sides 20 (FIG. 3) so the pointer is mounted on the hub against rotation. A nut 31, threaded onto tip 18 engages the front face of pointer 30 and holds the pointer against shoulder 21 of the hub. The thickness of connector element 28 is slightly greater than the distance between shoulders 21 and 22 so the connector element is held against axial movement relative to the hub.

Figures 4, 5, 8, 9:
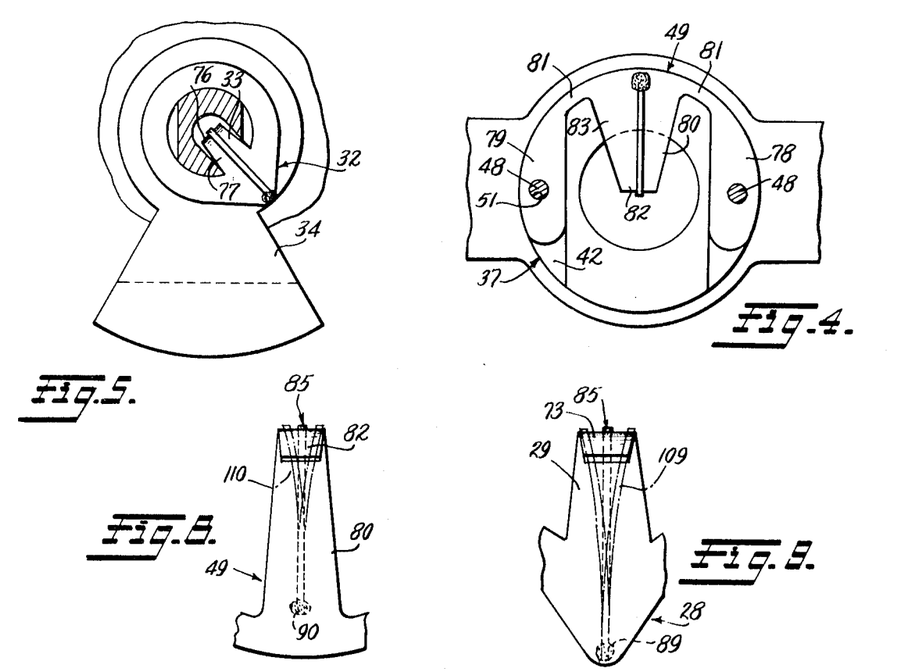
FIG. 4 is an enlarged view in section taken along line 4—4 of FIG. 2.
FIG. 5 is an enlarged view in section taken along line 5—5 of FIG. 2.
FIG. 8 is a view taken along line 8—8 of FIG. 7 and shows the details of the band-supporting portion of one of the connector elements.
FIG. 9 is a view taken along line 9—9 of FIG. 7 and shows the details of the other band-supporting connector element.

Hub 17 is substantially identical to hub 16. Mounted on hub 17 is a first or inner connector element 32 which is identical to connector element 28. Connector element 32 has a ring-shaped body that extends around cylindrical portion 23 of hub 17 and a radially inwardly projecting arm 33 that extends through slot 25. The inner face of element 32 engages shoulder 22 of the hub. A counterweight 34 with an opening therein having flat sides corresponding to sides 20 of cylindrical portion 19 extends over the cylindrical portion and seats against shoulder 21 (FIGS. 2 and 5). The flat sides prevent rotation of the counterweight relative to hub 19. A nut 35 identical to nut 31 is threaded onto tip 18 of hub 17 to hold the counterweight and connector element 32 against endwise movement.

Formed in front frame element 4 is a cylindrical bore 36. Extending through bore 36 is a molded bushing 37 formed from a semirigid thermoplastic material with good electrical insulating properties, such as polyethylene or Teflon. Bushing 37 has a frustoconical inner end 38 which extends outwardly of cylindrical body 39 and terminates at a transverse shoulder 39'. Shoulder 39' engages the inner surface 40 of front frame element 4 to prevent movement of the bushing in a direction away from coil assembly 3. End 38 is transversely split so it can be inserted through bore 36. Bushing 37 also has an enlarged head 40 with a transverse annular surface 41 that faces toward shoulder 39'. The front face 42 of head 40 is cut at an angle along one side as at 42'. Formed in front face 42 is a rectangular slot 43 which extends from one side of the head to the other and follows the contour of face 42.

Mounted on cylindrical body 39 of bushing 37 is a zero setting or adjusting arm 44 having its outer surface in engagement with surface 41. Arm 44 is secured to the bushing advantageously, with an epoxy cement, so the arm is fixed against movement relative to the bushing. Positioned on body 39 adjacent arm 44 is a flat washer 45. A Belleville-type spring washer 46 is positioned on body 39 between outer surface 47 of front frame element 4 and the flat inner face of a washer 45. It will be observed with reference to FIG. 2 that the body 39 of bushing 37 is mounted for rotation in opening 36 of frame element 4 and that shoulder 39' of the bushing is biased into engagement with inner surface of the frame element by the action of the Belleville spring 46.

As shown at FIG. 4, a pair of spaced-apart pins 48, formed integrally with bushing 37 project outwardly from the front face 42 of the bushing. A second connector element 49 of generally U-shaped configuration, having a radially inwardly projecting arm 80, is provided with openings 51 (FIG. 4) to receive the pins 48. Connector element 49 is sandwiched between a front end member 52 and the front face 42 of bushing 37. As shown at FIGS. 1 and 4, the pins 48 project through openings in member 52 and extend beyond the front face 53 of the member. The member 52 and connector element 49 are connected to the bushing against rotational, as well as axial movement by deforming the portions of the pins which extend through member 52 with a heated instrument so the tips of the pins are deformed as at 54, over front face 53.

Bushing 55 at the opposite end of the meter is identical to bushing 37 and extends through a cylindrical opening 56 in rear frame element 5. Bushing 55 has a transversely split tapered end 57 terminating at a transverse shoulder 58, which engages the inner surface 59 of rear frame element 5. The head 60 of the bushing is identical to head 40, previously explained, and has a bevelled side 61, and a rectangular slot 62 formed in the end face 63 of the bushing. A Belleville-type spring washer 64 is mounted on the bushing and engages the outside face 65 of frame element 5, and also engages one face of a washer 66. A spacer washer 67 engages the transverse surface 68 of head 58. Secured to the outer end of the bushing is a second or outer connector element 69 identical to connector element 49, and an end member 70 identical to end member 52. End member 70 and connector element 69 are secured to bushing 55 in the same manner as explained for end member 53 and connector element 49.

Figure 3:
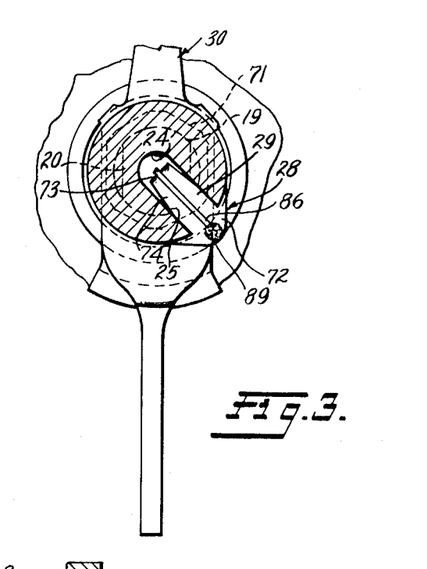
FIG. 3 is an enlarged view in section taken along line 3—3, of FIG. 2.
Figure 7:
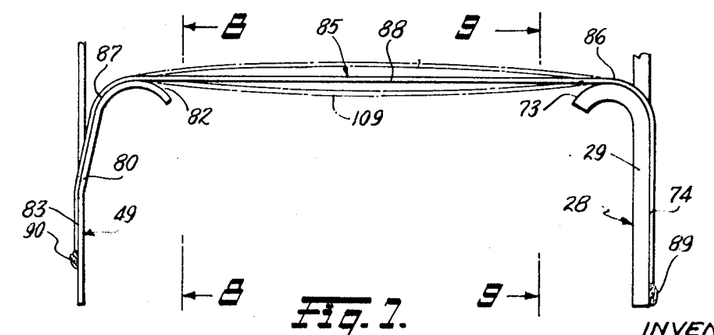
FIG. 7 is a front elevational view of the taut band and connector elements of the embodiment of FIG. 6.

As shown at FIG. 3, connector element 28 has a flat ring-shaped body 71, and arm 29 projects inwardly from the body. Body 71 is enlarged transversely, along the length of arm 29 to provide an outwardly extending lug 72. This outwardly extending lug 72 permits securing the taut band element to connector element 28 at a location spaced substantially from the axis of rotation of coil 14, in a manner which will be explained in detail. As shown at FIGS. 2 and 7, connector element 28 has a thickness which is substantially greater than the thickness of outer connector element 49 so the arm 29 is rigid. The inner end of rigid arm 29 is curved through an angle of approximately 150° so it presents a convex surface 73 which merges smoothly with the transverse surface 74 along the length of arm 29.

Connector element 32 is identical to connector element 28 and has a tranversely elongated lug 75 projecting outwardly along arm 33. The connector element has a rounded end with a convex surface 76 that merges smoothly with the transverse surface 77 of arm 33. Arm 33 is rigidlike arm 29.

As shown at FIG. 4, connector element 49 is generally U-shaped, having supporting legs 78 and 79 which lie flat against the front face 42 of bushing 37. An arm 80 is connected to legs 78 and 79 via relatively thin connecting portions 81 between the respective legs and the arm. Connector element 49 is formed from a sheet of thin spring material, such as phosphor bronze, so arm 80 is resilient and can flex in a direction toward and away from coil 14. Arm 80 has a rounded tip which curves through an angle of approximately 150° and extends toward coil 14. The rounded tip presents a convex surface 82 which merges smoothly with the transverse surface 83 of the outer face of the arm.

Connector element 69 is identical to connector element 49 and has a resilient arm 80' like the arm 80 of connector element 49.

Figure 6:
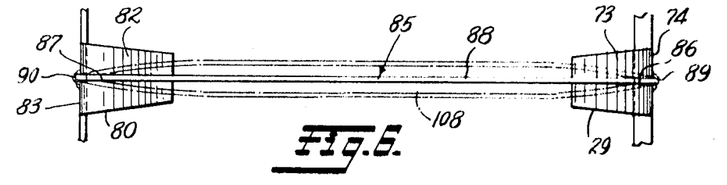
FIG. 6 is an enlarged plan view of one embodiment of the taut band and portions of its connector elements, showing the freedom of movement of the band along the surfaces of the connector elements.

A first taut band element 85 of rectangular cross section extends between outer connector element 49 and inner connector element 28. As shown at FIGS. 6 and 7, band element 85 has a first portion 86 which extends along transverse surface 74 of connector element 29, and across convex surface 73 of the connector element. One wide face of the band engages these surfaces. Band element 85 also has a second portion 87 which extends along transverse surface 83 of arm 80 and across the convex surface 82 of this arm. Extending between the portions 86 and 87 is an intermediate portion 88. As shown at FIGS. 3 and 7, portion 86 of band 85 is secured to connector element 28 at lug 72 with a relatively small spot of solder 89. Similarly, as shown at FIGS. 4 and 7, portion 87 of band 85 is secured to arm 80 adjacent the outer end of the arm with a spot of solder 90.

In a similar manner, a second taut band 91 (FIG. 2) is connected between inner connector element 32 and outer connector element 69, at the rear of the meter.

While the ends of the band are secured to the respective connector elements with the solder spots 89 and 90, it would be preferred to connect these ends to the connector elements so the ends would be free to pivot relative to the point of connection. Because of the very small dimensions of the band, such a pivotal connection is not commercially feasible. Were it possible to obtain a true pivotal connection, transverse bending stresses in the band adjacent the connection, as a result of transverse movement of the band relative to the connector elements, would be substantially eliminated. Such stresses, are however, reduced to permissible values by securing the band ends to the connectors at a substantial distance from the band axis.

With reference to FIG. 2, with connector element 29 positioned on hub 16, connector element 49 positioned on bushing 37, and with connector elements 33 and 69 similarly positioned at the other end of the meter, coil assembly 3 is suspended by taut bands 85 and 91 for pivotal movement about the axis of these bands. After bands 85 and 91 are initially tensioned, they are maintained under sufficient tension by the resilient arms of connector elements 49 and 69 so the axis of rotation of the coil assembly is essentially the same regardless of the orientation of the meter.

As previously explained, both bushing 37 and bushing 55 are free to rotate in the respective frame elements 4 and 5. Such freedom of rotation permits adjusting the torsion in the taut bands 85 and 90, after the meter is assembled, so the restoring force from the bands to return coil assembly 3 and pointer 30 to zero position can be precisely set by rotating bushings 37 and 55. After the initial adjustment of bushing 55, this bushing is secured to frame element 5 against rotation with a suitable cement. Thereafter, the zero set, during each use of the meter can be provided by rotating bushing 37 via adjusting arm 44.

With the meter assembled as shown at FIG. 2, coil assembly 3 is suspended between connectors 49 and 69 by the taut bands. Nut 31 of hub 16 extends into the central cylindrical opening 93 of bushing 13 and nut 31 of hub 17 extends into the bore 94 of bushing 55. It will be observed with reference to FIG. 2 that there is only a slight clearance between the external surface 95 of the nut on hub 16 and internal surface 93, and that similarly, there is only a slight clearance between external surface 96 of the nut on hub 17 and internal surface 94. Surfaces 93 and 95 function as stop surfaces to limit transverse movement of the coil assembly.

Axial movement of coil assembly 3, in the event of impact, is limited by the engagement of inside front surface 97 of coil form 15 with front surface 98 of core 8, and the extent of movement of the coil assembly axially in the opposite direction is limited by engagement of the rear inside surface 99 of the coil form 15 with rear surface 100 of the core.

As previously explained, arm 80 of connector element 49 is resilient. As shown at FIG. 1, the end member 52 has inwardly projecting tabs 101 which extend across the transverse surface 83 of the arm. As shown at FIG. 2, the inside surface 102 of tabs 101 is normally spaced slightly from arm 80. However, in the event of substantial shock or impact, surfaces 102 function as stop surfaces which are engaged by transverse surface 83 of the arm to limit the extent of deflection of arm 80 in a direction away from coil assembly 3. Stop surfaces 104, on the inner surface of end member 70, similarly cooperate with arm 80' to limit its deflection in a direction away from coil assembly 3, as a result of shock or impact. Advantageously, the stop surfaces 102 and 104 are so spaced from the arms that the maximum deflection of each arm away from the coil is less than the distance the coil assembly 3 can move axially from its normal position, before it engages one of the stop surfaces 98, 100 of the core.

The convex surface 73 of arm 29, while curved in front elevational as shown at FIG. 7, is substantially flat in a direction perpendicular to the side edge of portion 86 of the band and is substantially wider than the band. Hence, convex surface 73 takes the form of the surface generated by a straight line moved along the curvature of the surface in a direction perpendicular to the length of the line. While the convex surface does have some characteristics of a cylindrical surface, this convex surface need not be truly cylindrical. Since convex surface 73 includes any of a number of lines parallel to each other and perpendicular to the edge of portion 86 of the band, convex surface 73 will be termed transversely flat.

The convex surface 82 of connector element 49 is similarly transversely flat and of a width substantially greater than the width of taut band 85. Convex surface 82 also has the curvature of a straight line moved perpendicular to its axis along the curvature of the convex surface.

Band 85 is formed from a ribbon of a suitable alloy having a width from eight to 12 times its thickness. While in the meter of this invention, bands 85 and 91 are each 4 mils wide and 0.4 mils thick, bands 4 mils wide by 0.3 mils thick, as well as bands 4 mils wide by 0.5 mils thick can also be used to advantage. Since the band has substantial width as compared to its thickness, stresses are established in the side edges of the band as a result of attempting to pivot the band transversely about the solder spots 89 and 90. (As previously explained, the ideal manner of connecting the band ends to the respective connectors would be to pivotally connect these ends to the connectors.) However, it has been found that the bands will curve elastically like a beam in response to a force applied to a side edge of the band, as when the band moves transversely and attempts to pivot about the solder point. Correspondingly, the portions 86 and 87 of the bands which extend along the respective arms 29 and 80 will curve along their length about a long radius if a band is displaced from its normal central position on the arms without creating excessive stress in the band at the solder points 89 and 90. However, such elastic curvature with the absence of stress at the solder points can be obtained only if a substantial length of the band extends along each arm. It has been found that remarkable resistance to breakage of the band in the event of severe impact is obtained if the convex surface, at the tangent point with the intermediate portion 88 of the band, is sufficiently wide that the band can move through an angle of 11°–18° about the solder point where the band is fixed to the arm. It has also been found that a band 4 mils wide and 0.4 mils thick will curve elastically transversely of its length about the solder point, if the length of the band between the solder point and the tangent point with the convex surface is at least 50 mils and if the movement of the band from its neutral or central position does not exceed 10°.

RESISTANCE OF THE SUSPENSION SYSTEM TO IMPACT

With reference to FIGS. 2 and 6–9, what is believed to occur when meter 1 is subjected to impact, and what is believed to prevent breakage of the fragile bands when used in the taut band suspension system of this invention, will now be explained. First, consider what happens when the meter is dropped so it lands on a surface adjacent its end member 70 with the axis of rotation of the coil vertical. At the moment of impact, support assembly 2 will immediately stop, but coil assembly 15 will continue to move until its stop surface 97 engages the front face 98 of core 8. Such axial movement of coil assembly 3 is permitted by resilient arm 80 of connector element 49. At the instant of impact, the arm 80, because of its mass, will deflect toward coil assembly 3. The arm 80, however, can deflect a greater distance toward coil assembly 3, than coil assembly 3 can move axially before it engages the stop surface 98 of core 8. Hence, band 85 is relaxed. At the opposite end of the meter, at the moment of impact, connector element 32 moves with the coil assembly toward end member 70. The resilient arm 80' of connector element 69 deflects in a direction away from the coil assembly 3, but its movement is limited by engagement with stop surface 104 and is less than the movement of the coil assembly. Hence, at the instant of impact taut band 91 is also relaxed.

Immediately after impact, resilient arm 80 will spring back and engage taut band 85 to pull coil assembly 3 back to a suspended position. While there may be some vibration, the coil assembly will ultimately return to its suspended position between the connector elements 49 and 69. If the shock or impact is applied squarely to end member 70, there will be no transverse forces acting on either band, and hence, even though both bands 85 and 91 were substantially relaxed at the instant of impact, the band will return to approximately a central position on the convex surfaces of the several connector elements.

Now consider the movement of the coil assembly and bands when the meter is dropped os its axis is horizontal. Assume for purposes of this explanation that arm 29 and arm 80 are in the same radial plane, as shown at FIG. 7, and that these arms are vertical at the instant of impact. At the instant of impact, frame assembly 2 will stop, but coil assembly 3 will continue to move in a direction perpendicular to its axis until the outside surface 95 of the nut on hub 16 engages the inside stop surface 93 of bushing inside 37, and the outside surface 96 engages the inside surface 94 of bushing 55. At the instant of impact, the intermediate portion of band 85, because of its inertia, may deflect downwardly to the phantom line position 109, but because of the smooth convex surfaces 73 and 82, there is no stress concentration along the length of the band. Along portions 86 and 87 of the band which extend around the convex surfaces and along the smooth surfaces of the respective arms, it is believed that there is sufficient friction to prevent stress concentration in the bands at the solder points 89 and 90.

Now consider the action of the suspension system to resist breakage of the taut bands when the arms 29 and 80 are radially aligned, the meter is dropped, and the arms are horizontal at the moment of impact. At the instant of impact, frame assembly 2 will stop instantly, but coil assembly 3 will continue to move until the surfaces 95 and 96 of nuts 31 engage the respective stop surfaces 93 and 94 of bushings 37 and 55. The effect of such movement of the coil assembly is to displace element 28 from its normal position. Thus, there is some relative movement between connector element 28 and connector element 49, with the result that the tension in band 85 may increase slightly as a result of this movement. In addition, band 85, by virtue of its own inertia, will continue to move toward the position of the band 108 shown in phantom lines at FIG. 6. Because portion 86 of the band extends along the convex surface 73 and the smooth transverse surface 74 of connector element 28, and because the portion 86 of the band is sufficiently long that it can curve elastically along its length, the portion 86 will move along convex surface 73 and transverse surface 74 and will curve as shown at 109 of FIG. 9, but will not create stress concentrations at solder point 89 sufficient to cause failure of the band. Likewise, portion 87 of the band will move along convex surface 82 and smooth transverse surface 83 of arm 80 and will also curve transversely as shown at 110 of FIG. 8, but will not break at solder point 90. As previously stated, a convex surface on the arms of sufficient width for the band to swing 11°-18° relative to the solder point, where the length of the band extending around the convex surface and along the transverse surface of the arms is 50 mils long and has a width of 4 mils exhibits excellent resistance to failure. As previously explained, convex surfaces 73 and 82 are transversely flat. Hence, any movement of band 85 transversely toward the position 108, where the band curves as at 109 and 110, results in an increase in the length of the band with a corresponding increase in the tension in the band. As the tension in the band increases, a resisting force is developed which tends to return the band to its central position against the action of the forces created by shock or impact. Since the transversely flat surfaces 73 and 82 are each of substantial width, band 85 cannot move a sufficient distance laterally along either surface to slide over the side edges of the connector elements. After the impact, the band will tend to return to its original centered position, but because of the friction between the length of portions 86 and 87 of the band, and the corresponding surfaces of the arms 29 and 80, the band may not return to its original position. Hence, the axis of the band 85 may become permanently displaced from its original or central position, as shown for portion 85 of the band. While this displacement of the band, which may also occur with band 90, will affect the accuracy of the instrument, because the axis of the coil assembly 3 is correspondingly displaced, it has been found that the extent of deviation in accuracy was less than 3½ percent at midscale and that the bands did not fail when the meter was subjected to severe impact with decelerations on the order of 7,000 G's.

It will be appreciated that connector arms 29 and 80 will not usually be radially aligned with each other at the instant of impact of the meter, because the relationship between these arms depends on the angular position of coil assembly 3. However, where the arms are aligned in a horizontal plane at the moment of impact, as explained with reference to FIG. 6, the most severe stresses that can be experienced are exerted on the bands at the solder points 89 and 90. Such impact tends to cause the bands to fail by bending at the edge of the solder point. It will be appreciated, however, that the two arms which support a particular band may have virtually any angular relationship to each other and that the stresses in the bands at impact will be substantially less when the arms are displaced angularly then when the arms are aligned. It is also unlikely that the meter will ever be dropped so it lands with its axis precisely horizontal or with its axis precisely vertical as in the previously explained examples. Hence, the action of the suspension system in avoiding damage to the taut bands is believed to be the result of a combination of the actions explained above.

THE EMBODIMENT OF FIGS. 10-13

Figure 10:
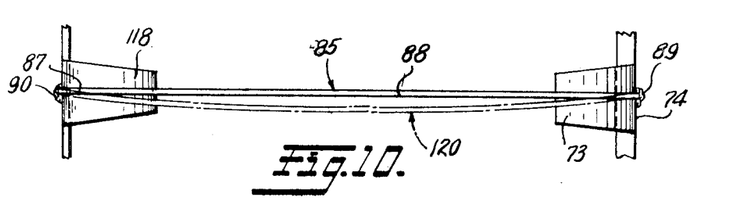
FIG. 10 is a view corresponding to FIG. 6 and shows a second embodiment of the taut band and connector elements of this invention.
Figure 11:
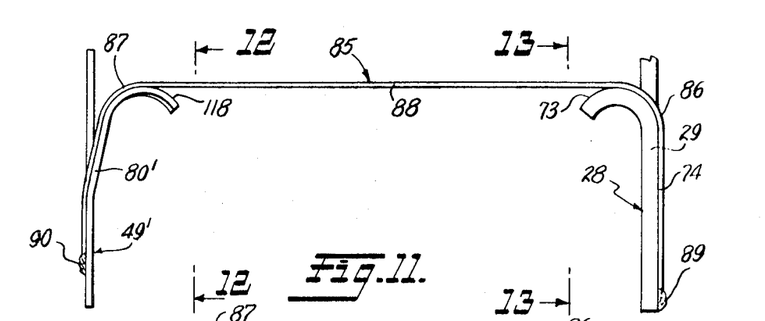
FIG. 11 is a front elevational view of the taut band arrangement of FIG. 10.
Figure 12:
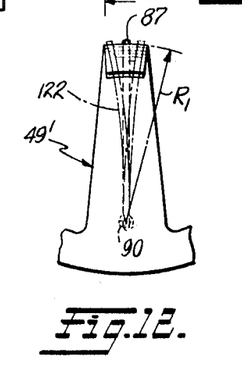
FIG. 12 is a view taken along lines 12—12 of FIG. 11 showing a portion of one of the connector elements.
Figure 13:
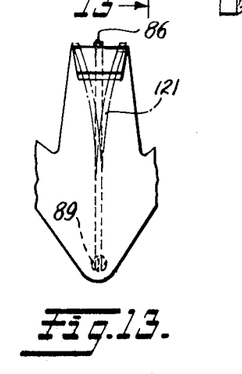
FIG. 13 is a view taken along line 13—13 of FIG. 11 and showing a portion of the other connector element.

FIGS. 10-13 show a second embodiment of the suspension system of this invention. The suspension system of this second embodiment includes a first or inner connector element 28 which is identical to the connector element 28 previously described for the embodiment of FIGS. 6, 7 and 9. The connector element 28 includes a rigid arm 29 and a transversely flat convex surface 73. In addition, there is the transverse surface 74 along the back of the connector arm. As shown at FIGS. 10, 11 and 13, the band or ribbon 85 extends across convex surface 73, along transverse surface 74, and is secured by a solder spot 89 in the same manner as described for the arrangement of FIGS. 6, 7 and 9.

The second embodiment also includes a connector element 49' with a resilient arm 80'. Arm 80' has a curved end which presents a convex surface 118 as viewed in front elevation at FIG. 11. Convex surface 118 is also convex, as viewed in side elevation at FIG. 12, and has a radius $R_1$ equal to the distance between solder point 90 and the point of tangency of the convex surface with the intermediate portion 88 of the band.

The connectors 28 and 49' are mounted in a manner identical to that previously explained for connector elements 28 and 49, and an identical taut band 85 with portions 86 and 87, like those previously described, extend around the convex surfaces and transverse surfaces of the arms and are secured in a like manner. It is to be understood that the connectors 28 and 49' of the second embodiment represent only the suspension at one end of the moving coil and that at the opposite end of the moving coil there will be an arrangement like that of FIG. 2, wherein there is an inner connector element 33, a taut band 91, and an outer connector element 49' substituted for connector element 69.

Referring again to FIGS. 10-13, the transversely flat convex surface of rigid arm 29 has the curvature of a surface generated by a straight line moved along a curved path which follows the curvature of convex surface 73. However, the curvature of convex surface 118 of resilient connector element 49' has the curvature of a surface generated by an arc of a circle of radius $R_1$ moved along a curved path which follows the curvature of the convex surface 118.

Connector elements 28 and 49' cooperate with band 85 in a manner identical to that previously explained, to prevent breakage of the band when the meter is subjected to shock or impact in a direction parallel to the axis of band 85, as well as shock or impact in a direction perpendicular to the axis of band 85 and parallel to the length of arms 29 and 80'. However, when an impact force is applied perpendicular to the axis of the band and also perpendicular to the length of arms 29 and 80', there is a slight difference from the action previously explained.

Shock or impact as caused by dropping the meter so it lands with band 85 horizontal, and arms 29 and 80' horizontal and aligned, causes central portion 88 of the band to deflect downwardly to the position 120 of FIG. 10. Because of the second degree of curvature of radius $R_1$ of the convex surface 118, portion 87 of the band more readily slides along this convex surface to follow the displacement of the portion 88 of the band. However, because portion 86 of the band still engages the transversely flat surface 73 of the arm 29, the portion 86 is less apt to slip sideways than is the portion 87. Hence, while there is some tensioning of the band or ribbon 85, the tensioning is not as severe for a particular displacement of the band axis as with the first embodiment, previously described, where both connectors are transversely flat. However, the extent of this tensioning is sufficient to prevent portion 87 from slipping over the side edges of the transversely curved surface 118 of connector element 49'. It will be understood however, that the portion of band 86, which extends along convex surface 73 and transverse surface 74 of connector element 28 still assumes a gradual long radius curvature as shown at 121 of FIG. 13. Likewise, the portion 87 of the band extending along transverse surface 83' and convex surface 118 also assumes a long radius curvature as shown at 122 of FIG. 12. Hence, there are no sharp bending stresses at either solder point 89 or solder point 90.

After the impact, the band will tend to return to its original position, but because of the friction between the band and the surfaces of the connector elements, the band will not return all the way to its original position but will ultimately assume a position intermediate that shown for the band 85 and the position 120 of FIG. 10. While the meter will again have some inaccuracy because the axis of rotation of coil assembly 3 is displaced from its initial centered position, the extent of inaccuracy of the position of the pointer at a midscale reading is usually less than 3½ percent, and is tolerable, since the meter would be completely useless if either taut band failed. The action of the taut band 91 at the opposite end of the meter when used with a connector element 49' is of course identical to the action described for the taut band 85 with reference to FIGS. 10-13.

Figure 14:
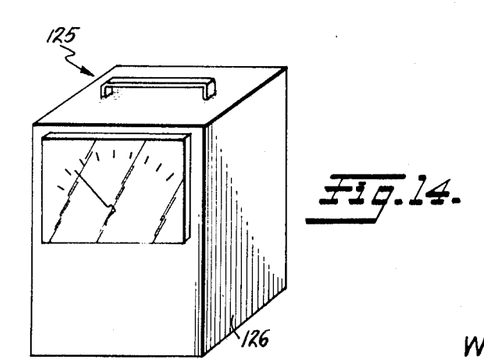
FIG. 14 is a pictorial view of a portable measuring instrument embodying the meter of this invention.

FIG. 14 shows the meter of this invention in the environment of a portable test apparatus 125 in which the meter may be subjected to severe shock or impact if the apparatus cabinet 126 is bumped or dropped either while in use or while it is transported.

While two preferred embodiments of the suspension system for instruments in accordance with this invention have been shown and described in detail, it is to be understood that the described embodiments are exemplary of the invention and that numerous changes and modifications can be made without departing from the scope of this invention.

I claim:

1. In an electric meter of the type having a stationary structure including a permanent magnet, a moving coil, and a taut band suspension system for said coil characterized by excellent resistance to breakage of the band as a result of severe shock and impact, said meter comprising, in combination, a first taut band assembly and a second taut band assembly, said taut band assemblies suspending said coil for rotary movement about an axis, each of said assemblies comprising a first connector element connected to said moving coil and having a rigid arm extending transversely of the axis of rotation of the coil and terminating at a tip extending away from the coil and presenting a convex support surface tangent to said axis, a second connector element supported by the stationary structure of the meter and having a resilient arm extending transversely of said axis and terminating at a tip extending toward said coil and presenting a convex support surface tangent to said axis, said convex surface of at least one of said connector elements having a second convex curvature in a plane perpendicular to the coil axis at the tangent point of the convex surface with said axis;

said rigid arm having a smooth transverse surface facing toward said coil and said resilient arm having a smooth transverse surface facing away from said coil, a taut band having a first portion extending along the transverse surface of said rigid arm in a direction toward said axis, and around said convex surface of said rigid arm, the taut band also having an intermediate portion extending between said convex surfaces and along said axis, and having a second portion extending across said convex surface of said resilient arm and along said transverse surface of said resilient arm, means securing said first and second portions to the transverse surfaces along which they extend at locations spaced substantially from said axis, whereby a substantial length of the first portion of the band is unrestrained along the transverse surface and convex surface of said rigid arm, a substantial length of said second portion is unrestrained along the transverse surface and convex surface of said resilient arm, and said intermediate portion is correspondingly free to shift transversely to displace the axis of rotation of the coil in the event of severe shock or impact;

said resilient arm of each connector assembly maintaining its associated taut band in tension to maintain said coil suspended between said resilient arms;

stop means for limiting the extent of axial movement of said coil relative to said stationary structure; and stop means for limiting the extent of transverse movement of said coil relative to said stationary structure.

2. A meter according to claim 1 wherein said first connector element of each taut band assembly has said second convex curvature.

3. In a measuring instrument, the combination of a rotor;

support means; and a taut band suspension means mounting said rotor on said support means for rotary movement relative thereto, said suspension means comprising two inner connector members secured to said rotor and spaced apart axially thereof, two outer connector members carried by said support means and each spaced outwardly from a different one of said inner connector members, and two thin resiliently flexible taut band suspension elements, one of said suspension elements being connected between one of said inner connector members and the corresponding one of said outer connector members, the other of said suspension elements being connected between the other of said inner connector members and the other of said outer connector members, said suspension elements being axially aligned when taut and laterally undistorted and then defining the axis of rotation for said rotor, said inner connector members each having a convex support surface so disposed that its axis of curvature extends at least substantially at right angles to said axis of rotation, said outer connector members having a convex support surface so disposed that its axis of curvature extends substantially at right angles to said axis of rotation, each of said suspension elements extending from a fixed point spaced radially from said axis of rotation toward said convex support surface of the corresponding one of said inner connector members, thence over said support surface, thence toward the corresponding one of said outer connector members and over said convex support surface of said outer connector member, and thence to a fixed point spaced radially from said axis of rotation, the suspension element when taut and laterally undistorted extending between said convex support surfaces along a line which is coincident with said axis of rotation and tangent to said convex support surfaces, said support surfaces being smooth and uninterrupted and having a dimension, in a direction transverse to said axis of rotation, which is large compared to the transverse dimension of said suspension elements, said suspension elements each being secured at said fixed points but being otherwise free and independent of said connector members save for being in contact therewith, said outer connector members being resiliently arranged on said support means to apply to the respective ones of said suspension elements a force normally maintaining the suspension element in tension and therefore in firm engagement with the respective ones of said convex support surfaces, said inner connector members resisting such force;

said rotor and said support means having cooperating stop means arranged to limit relative movement between said rotor and support means in directions parallel to said axis of rotation and also in directions transverse to said axis of rotation, said stop means being operative to limit such relative movement in directions parallel to said axis of rotation to a first predetermined small distance;

said outer connector members and said support means having cooperating stop means arranged to limit to a second predetermined small distance relative movement between said convex support surfaces of said outer connector members, on the one hand, and said support means, on the other hand, when such relative movement is in a direction tending to increase the tension on the respective one of said suspension elements, said second predetermined distance being smaller than said first predetermined distance, said outer connector members being so constructed and arranged on said support means as to allow movement of said convex support surfaces of said outer connector members toward said inner connector members under the influence of shock forces tending to cause such movement;

said taut band suspension means being capable of surviving high-shock forces, without damage to said suspension elements, by reason of the fact that said suspension elements can move laterally across said convex support surfaces when such shock forces occur.

4. The combination defined in claim 3, wherein said outer connector members each comprise a resilient arm secured to said support means at a point spaced radially from said axis of rotation, said arm extending toward said axis of rotation and terminating in said convex support surface of the outer connector member, said arm including a surface which faces outwardly and curves smoothly into said convex support surface, the respective suspension element extending from said convex support surface along said outwardly facing surface and being secured to said connector member at said fixed point.

5. The combination defined in claim 3, wherein said convex support surfaces are flat in directions transverse to said axis of rotation.

6. The combination defined in claim 3, wherein said convex support surface of said outer connector members are each also curved about an axis parallel to and spaced from said axis of rotation on the same side thereof as is said first-mentioned axis of curvature.

7. The combination defined in claim 6, wherein said axis parallel to said axis of rotation passes through said fixed point at which the corresponding end of the respective one of said suspension elements is secured.

8. The combination defined in claim 3, wherein said suspension elements are of elongated rectangular transverse cross section and have a width substantially greater than the thickness thereof, said suspension elements each extending with one of its wider side surfaces in sliding engagement with the respective ones of said convex support surfaces.

9. The combination defined in claim 3, wherein each of said inner connector members includes an inwardly facing surface directed toward said rotor, which surface extends generally transversely of said axis of rotation and curves smoothly into said convex support surface of said inner connector member;

each of said suspension elements includes one end portion which extends from said convex support surface of the corresponding one of said inner connector members along said inwardly facing surface of that connector member and is secured to that connector member at the respective one of said fixed points;

each of said outer connector members includes an outwardly facing surface extending generally transversely of said axis of rotation and curves smoothly into said convex support surface of said outer connector member; and each of said suspension elements includes another end portion which extends from said convex support surface of the corresponding one of said outer connector members along said outwardly facing surface of that connector member and is secured to that connector member at the respective one of said fixed points.

10. The combination defined in claim 9, wherein said fixed points lie respectively on said inwardly facing surfaces and said outwardly facing surfaces.

11. The combination defined in claim 9, wherein said convex support surfaces each have a dimension large enough, in a direction transverse to said axis of rotation, to support the respective one of said suspension elements throughout a lateral excursion defined by an angle of approximately 20° centered on the corresponding one of said fixed points.

12. The combination defined in claim 3, and further comprising two hub members each secured to a different side of said rotor, each of said hub members having a generally tubular portion, said tubular portions being coaxially aligned and each projecting away from said rotor toward a different one of said outer connector members, each of said tubular portions having a slot which extends both axially and radially through the wall thereof; and two fasteners each engaged over a different one of said tubular portions;

each of said inner connector members comprising a ring and an arm projecting radially inwardly relative to said ring and terminating in the respective one of said convex support surfaces, each of said inner connector members being disposed with said ring embracing said tubular portion of a different one of said hub members and said arm projecting inwardly through the corresponding one of said slots, each of said rings being secured by a different one of said fasteners.

13. In a measuring instrument, the combination of a rotor;

two nuts each engaged over said tubular portion of a different one of said hub members, each of said rings being secured between the corresponding one of said nuts and the one of said shoulders presented by the corresponding one of said hub members, two outer connector members each spaced outwardly from a different one of said inner connector members and secured to said support means and each comprising a resilient arm having a tip presenting a convex support surface, and two thin resiliently flexible suspension elements each having one end secured to a different one of said inner connector members and the other end secured to a different one of said outer connector members, said suspension elements each extending along said arm of the corresponding one of said inner connector members, over said convex support surface thereof, thence outwardly to the corresponding one of said outer connector members and over said convex support surface thereof, and thence along said resilient arm of said outer connector member, the portions of said suspension elements which extend between said inner and outer connector members being maintained taut by resilient action of said arms of support means; and taut band suspension means mounting said rotor on said support means for rotary movement relative thereto, said suspension means comprising two hub members each comprising an externally threaded tubular portion having a slot extending longitudinally and radially through the wall thereof, and means at one end of said tubular portion presenting a transverse shoulder, said hub members being secured each to a different side of said rotor with said tubular portions coaxially aligned and projecting from said rotor in opposite directions, two inner connector members each comprising a ring and an arm projecting inwardly from said ring and terminating in a tip presenting a convex support surface, said inner connector members each being disposed with said ring embracing said tubular portion of a different one of said hub members and said arm projecting inwardly through said slot of said tubular portion, said outer connector members and being axially aligned, when taut and laterally undeformed, to define the axis of rotation for said rotor, each end of each of said suspension elements being secured to the respective one of said connector members at a point spaced a substantial distance from said axis of rotation, said convex support surfaces being smooth and uninterrupted, whereby said suspension elements can move laterally thereover.

14. The combination defined in claim 13, wherein each of said convex support surfaces of said outer connector members is also curved about an axis parallel to said axis of rotation and spaced therefrom in a direction such that both curvatures of said surfaces are convex with respect to the corresponding one of said suspension elements.